(12) United States Patent
Chiu et al.

(10) Patent No.: US 12,233,611 B2
(45) Date of Patent: Feb. 25, 2025

(54) FUNCTIONAL WAFERS BY 3D PRINTING

(71) Applicant: Essilor International, Charenton-le-pont (FR)

(72) Inventors: Hao Wen Chiu, Dallas, TX (US); Aref Jallouli, Dallas, TX (US); Haifeng Shan, Dallas, TX (US)

(73) Assignee: Essilor International, Charenton-le-Pont (FR)

( * ) Notice: Subject to any disclaimer, the term of this patent is extended or adjusted under 35 U.S.C. 154(b) by 147 days.

(21) Appl. No.: 17/915,933

(22) PCT Filed: Mar. 31, 2021

(86) PCT No.: PCT/EP2021/058511
§ 371 (c)(1),
(2) Date: Sep. 29, 2022

(87) PCT Pub. No.: WO2021/198374
PCT Pub. Date: Oct. 7, 2021

(65) Prior Publication Data
US 2023/0147427 A1    May 11, 2023

(30) Foreign Application Priority Data
Mar. 31, 2020    (EP) .................................... 20167150

(51) Int. Cl.
*B29D 11/00*    (2006.01)
*B29C 45/14*    (2006.01)
(Continued)

(52) U.S. Cl.
CPC ........ *B29D 11/00326* (2013.01); *B29C 45/14* (2013.01); *B29C 64/118* (2017.08);
(Continued)

(58) Field of Classification Search
CPC ......... B29L 2011/0016–005; B29C 70/68–865
See application file for complete search history.

(56) References Cited

U.S. PATENT DOCUMENTS

| 2004/0125337 A1 | 7/2004 | Boulineau et al. |
| 2015/0241714 A1 | 8/2015 | Allione et al. |

(Continued)

FOREIGN PATENT DOCUMENTS

| EP | 3437845 | 2/2019 |
| EP | 3495128 | 6/2019 |
| EP | 3579044 | 12/2019 |

OTHER PUBLICATIONS

International Search Report and Written Opinion issued in Corresponding PCT application No. PCT/EP2021/058511, dated Sep. 21, 2021.

*Primary Examiner* — John J DeRusso
(74) *Attorney, Agent, or Firm* — Norton Rose Fulbright US LLP

(57) ABSTRACT

A method of manufacturing an optical lens (417, 901), comprising: obtaining (S301) a transparent thermoplastic (TP) carrier (410, 1210) with at least one smooth surface; printing (S305), via a 3-D printer on the side opposite to the at least one smooth surface of the transparent TP carrier (410, 1210), at least one transparent layer (420, 1220) using a thermoplastic filament (403), each transparent layer (420, 1220) having a predetermined light filtering property, thereby forming a functional layer (420, 1220); and performing (S307) an injection over-molding process (415) to fuse bond the functional layer (420, 1220) to a thermoplastic substrate thereby forming the optical lens, wherein the at least one smooth surface of the transparent TP carrier (410, 1210) forms a smooth surface of the manufactured optical lens (417, 901).

16 Claims, 10 Drawing Sheets

(51) Int. Cl.
  *B29C 64/118* (2017.01)
  *B29L 11/00* (2006.01)
  *B33Y 10/00* (2015.01)
  *B33Y 80/00* (2015.01)

(52) U.S. Cl.
  CPC ... *B29D 11/0073* (2013.01); *B29L 2011/0016* (2013.01); *B33Y 10/00* (2014.12); *B33Y 80/00* (2014.12)

(56) References Cited

U.S. PATENT DOCUMENTS

| | | |
|---|---|---|
| 2015/0253585 A1 | 9/2015 | Anatole et al. |
| 2016/0003977 A1 | 1/2016 | Van De Vrie et al. |
| 2016/0096326 A1 | 4/2016 | Naware |
| 2019/0324293 A1 | 10/2019 | Marshall et al. |
| 2020/0012123 A1 | 1/2020 | Newman |

FUNCTIONAL WAFERS BY 3D PRINTING

CROSS-REFERENCE TO RELATED APPLICATIONS

This application is a national phase application under 35 U.S.C. § 371 of International Application No. PCT/EP2021/058511 filed 31 Mar. 2021, which claims priority to European Patent Application No. 20167150.0 filed 31 Mar. 2020. The entire contents of each of the above-referenced disclosures is specifically incorporated by reference herein without disclaimer.

BACKGROUND

Technical Field

The present disclosure is directed to a technique utilizing additive techniques for manufacturing a functional wafer that is suitable for producing an optical lens with a common injection over-molding process. For instance, an FDM 3-D printing process using a smooth thermoplastic carrier is proposed to produce a wafer with light filtering functions.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Corrective lenses including glasses and contact lenses are used to treat refractive errors in eyes such as myopia, hypermetropia, astigmatism, and prebyopia. Glasses are worn on the face a short distance in front of the eye. Contact lenses are worn directly on the surface of the eye.

Materials for lenses generally include glass and plastics. Glass lenses have become less common owing to their relatively high weight compared to plastic lenses. Plastic lenses are currently the most commonly prescribed lens, owing to their relative safety, low cost, ease of production, and high optical quality. The main drawbacks of many types of plastic lenses are the ease by which a lens can be scratched, and the limitations and costs of producing higher-index lenses. Polycarbonate is lighter weight than normal plastic. It blocks UV rays, is shatter resistant, and is used in sports glasses and glasses for children and teenagers. Because polycarbonate is soft and will scratch easily, scratch resistant coatings are typically applied after shaping and polishing of the lens.

Fused Deposition Modeling™ (FDM; sometime also referred to as Fused Filament Fabrication or FFF) is a cost-effective way of producing custom three dimensional (3-D) thermoplastic parts and prototypes. FIG. 1 is a schematic diagram of an FDM 3-D printer. A filament spool 101 containing filament 103 is supplied to an extruder 105, heated in a heater end 107, and fed through a nozzle 109 to produce a part 111 on a printing bed 113.

The FDM 3-D printer also includes a programmable controller. The programmable controller controls movement of the nozzle 109 in the planar X-Y direction and applies layers by moving in the Z-direction. In addition, the programmable controller controls the ejection of the heated filament. By controlling the movement of the nozzle and ejection of the heated filament, various patterns may be formed at each level in the X-Y plane of a layer, and application of layers in the Z-direction allows for forming various 3-D shapes. In addition, filament materials may be changed to produce layers of different materials.

A major disadvantage of FDM 3-D printing is its inability to produce at a fine enough resolution sufficient to achieve components of optical quality. The layering method of FDM results in many rigid edges (or sometimes small holes) on the surface of the part (see FDM printed functional wafer 201 in FIG. 2) that strongly scatter light leading to a rough and non-transparent appearance. Further, the layer adhesion mechanism makes FDM components inherently anisotropic and poor in impact strength. Hence, FDM 3-D printing at present time is generally perceived in the optical industry as not being suitable for use in optical lens production.

SUMMARY

A first aspect is a method of manufacturing an optical lens. The method includes obtaining a transparent thermoplastic (TP) carrier with at least one smooth surface; printing, via a 3-D printer on the side opposite to the at least one smooth surface of the transparent TP carrier, at least one transparent layer using a thermoplastic filament, each transparent layer having a predetermined light filtering property, thereby forming a functional layer; and performing an injection over-molding process to fuse bond the functional layer to a thermoplastic substrate thereby forming the optical lens, wherein the at least one smooth surface of the transparent TP carrier forms a smooth surface of the manufactured optical lens.

It is to be noted that the transparent TP carrier is preserved by this manufacturing method and is thus included in the final manufactured lens, in which the smooth surface of this carrier is therefore present.

Said at least one smooth surface may exhibit a roughness average parameter Ra which is greater than or equal to 50 nm.

In a second aspect, the printing includes printing, via the 3-D printer, a plurality of transparent layers, each transparent layer having a different light filtering property to form a multi-functional layer, in which the light filtering property is one of a group consisting of ultraviolet (UV) cut, blue cut, color enhancement, photochromic, and near infrared (NIR) cut.

In a third aspect, the transparent TP carrier has at least one predetermined light filtering property.

In a fourth aspect, the thermoplastic filament includes a filament material that is compatible with a material of the transparent TP carrier in order to strengthen bonding of the transparent layer to the transparent TP carrier.

In a fifth aspect, the filament material is selected from a group consisting of polycarbonate (PC), alicyclic polycarbonate copolymer, poly(methyl methacrylate) (PMMA), poly(methyl methacrylimide) (PMMI), polyamide (PA), polyester, copolyester, polysulfone (PSU), cellulose triacetate (TAC), thermoplastic polyurethane (TPU), and cyclic olefin copolymer (COC).

In a sixth aspect, the thermoplastic substrate has a material that is compatible with a material of an outmost layer of the functional layer in order to strengthen bonding of the thermoplastic substrate to the functional layer.

In a seventh aspect, the transparent TP carrier is a polarizing laminate of a plurality of layers, wherein two or more of the layers are of different materials selected from a group consisting of polycarbonate (PC), polyvinyl alcohol (PVA), cellulose triacetate (TAC), polyamide (PA), cyclic olefin copolymer (COC), thermoplastic polyurethane (TPU), and multi-layer optical film (MOF).

In an eighth aspect, the transparent TP carrier is a photochromic laminate of a plurality of layers, wherein two or more of the layers are of different materials selected from a group consisting of polycarbonate (PC), polyurethane (PU), polyether block amide (PEBA), cellulose triacetate (TAC), polyamide (PA), cyclic olefin copolymer (COC), and thermoplastic polyurethane (TPU).

In a ninth aspect, the printing further includes heating the TP carrier to a temperature ($T_{carrier}$) that is less than 50° C. below its glass transition temperature ($T_{g,\ carrier}$), such that 0° C.<$T_{g,\ carrier}-T_{carrier}$≤50° C., and heating is preferably such that 5° C.≤ $T_{g,\ carrier}-T_{carrier}$≤30° C.

In a tenth aspect, the printing further includes incorporating a specific pattern into the at least one transparent layer.

In an eleventh aspect, the specific pattern includes data regarding the lens manufacturer and is incorporated using IR absorbing dyes.

In a twelfth aspect, the specific pattern is for scattering light and is a set of rings, each ring being concentric, and made of joint circular shapes having 0.3 mm or less diameter with a refraction index of the transparent TP carrier which is different from the refraction index of the material of the specific pattern.

In a thirteenth aspect, the at least one transparent layer is printed as a grid made of a set of:
diffusing dots having different refractive index than that of the thermoplastic substrate, or of
light scattering dots having size between 100 nm and 10 µm.

In a fourteenth aspect:
the obtaining step of the transparent TP carrier is such that the transparent TP carrier is curved with smooth surfaces on both sides of the transparent TP carrier; and
the printing step is implemented via the 3-D printer on a concave side of the curved and transparent TP carrier.

In a fifteenth aspect, the at least one smooth surface of the transparent TP carrier faces a concave insert of an injection mold in which the injection over-molding process is performed.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
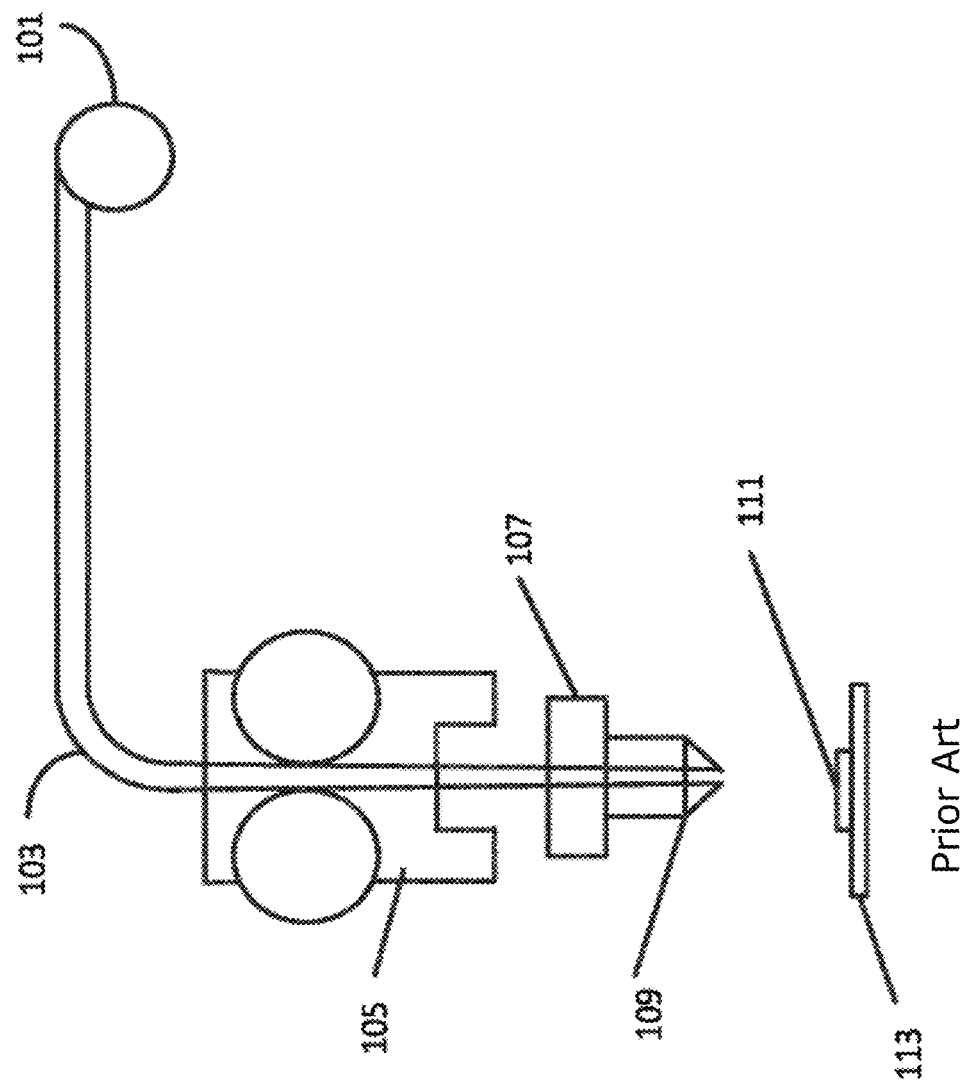
FIG. 1 is a schematic diagram of a FDM 3-D printer.
Figure 2:
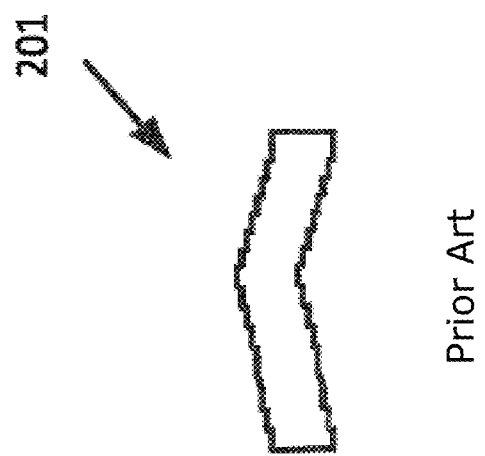
FIG. 2 is a FDM 3-D printed functional wafer.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values therebetween.

3D printing offers benefits such as being more cost effective for small volumes and quick prototyping tasks. FDM may be used to quickly and cost effectively produce a functional wafer from a thermoplastic filament having specific dyes and/or filters such as UV cut, blue cut, NIR cut, color enhancement, and photochromic.

One possible approach to using FDM for forming optical quality parts may be to integrate a functional wafer onto the front surface of an ophthalmic lens by conventional injection over-molding process (or film insert molding process). In this approach, during the conventional injection over-molding process, the front surface (convex surface) of the functional wafer is in contact with the cavity wall (concave insert surface) of the ophthalmic lens at a temperature well below its glass transition temperature $T_g$. The glass transition temperature characterizes a second order transition of amorphous polymers from brittle, glassy solids to viscous or rubber-like substances. The cavity temperature $T_{cavity}$ in the injection mold must be lower than the glass transition temperature of the wafer $T_{g,\ wafer}$ so that the functional wafer holds its shape when being inserted into the cavity. Further, the cavity temperature $T_{cavity}$ must be lower than the glass transition temperature of the lens material ($T_g$, lens) so the resulting lens is in a solid form that is rigid enough to be ejected without deformation. In this approach, $T_{cavity}$⇐ $T_{g,\ lens}$−20 (° C.). Moreover, the wafer material and the lens material should be the same in order to guarantee compatibility between the wafer and the lens for good bonding. In this case, $T_{g,\ wafer}=T_{g,\ lens}$.

However using this approach, even though the back surface (concave surface) of the wafer would be melted by the molten lens material and become an integral part of the resulting lens, the front surface would remain solid and keep its surface textures throughout the whole injection over-molding process. Consequentially, the surface of an ophthalmic lens integrating a functional wafer produced by FDM 3-D printing would not be smooth.

It is one object of the present disclosure to describe a method that uses an FDM 3-D printer to produce a functional wafer for producing an optical lens. In one aspect, a functional wafer printed by FDM 3-D printing is used with a conventional injection over-molding process to produce an optical lens.

A reason that a conventional injection over-molding process using a FDM 3-D printed functional wafer has not been able to achieve a lens of optical quality is because the front surface of the functional wafer is kept at a temperature well below its glass transition temperature $T_g$ and thus remains solid throughout the whole process. It has been determined that this problem can be overcome, at least, by first obtaining a single or multi-layer functional thermoplastic carrier with at least a smooth front surface, then 3D print additional functional layer(s) fuse-bonded onto a back surface of the carrier. At least the front surface of the thermoplastic carrier is smooth. The resulting 3D printed article would preserve the smooth front surface of the functional carrier while adding new functionality through the additional layer(s). The 3D printed article can be used as a functional wafer with conventional injection over-molding to produce an optical article with smooth surfaces.

In some embodiments, a flat, multi-layer, transparent thermoplastic (TP) carrier is obtained and an FDM 3-D printer is used to print a transparent layer on a side of the carrier. The transparent layer may be printed using a TP filament having specific light filters such as blue cut (BCT), color enhancement, photochromatic (PhCh), and Near Infrared (NIR) light cut to prepare a functional wafer. This functional wafer can then be used with a conventional injection over-molding process to produce an optical lens with the specific light filtering functions. In some aspects, several layers of different light filters can be printed on the carrier to prepare a wafer of multiple-functions such as PhCh/BCT, BCT/NIR cut, PhCh/BCT/NIR cut, and other light filtering functions.

Figure 3:
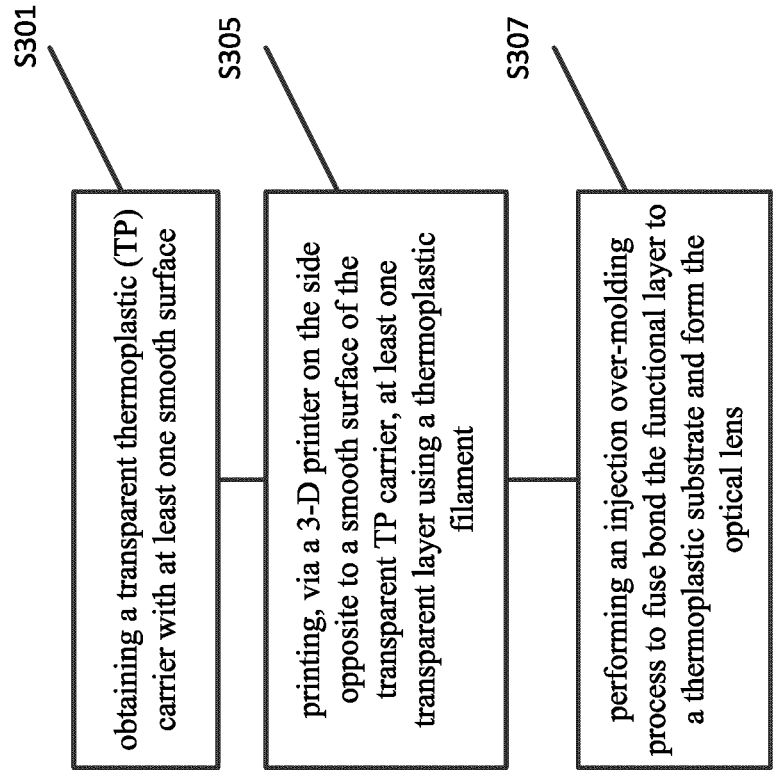
FIG. 3 is a flowchart of a method of manufacturing an optical lens using a FDM 3-D printer and injection over-molding in accordance with exemplary aspects of the disclosure.

FIG. 3 is a flowchart of a method of manufacturing an optical lens using an FDM 3-D printer and injection over-molding in accordance with exemplary aspects of the disclosure. The method of manufacturing an optical lens includes, S301, obtaining a transparent thermoplastic (TP) carrier with at least one smooth surface, S303, printing, via a FDM 3-D printer on the side opposite to the at least one smooth surface of the transparent TP carrier, at least one transparent layer using a thermoplastic filament, each transparent layer having a predetermined light filtering property, to form a functional layer, and, S307, performing an injection over-molding process to fuse bond the functional layer to a thermoplastic substrate to form the optical lens.

Figure 4:
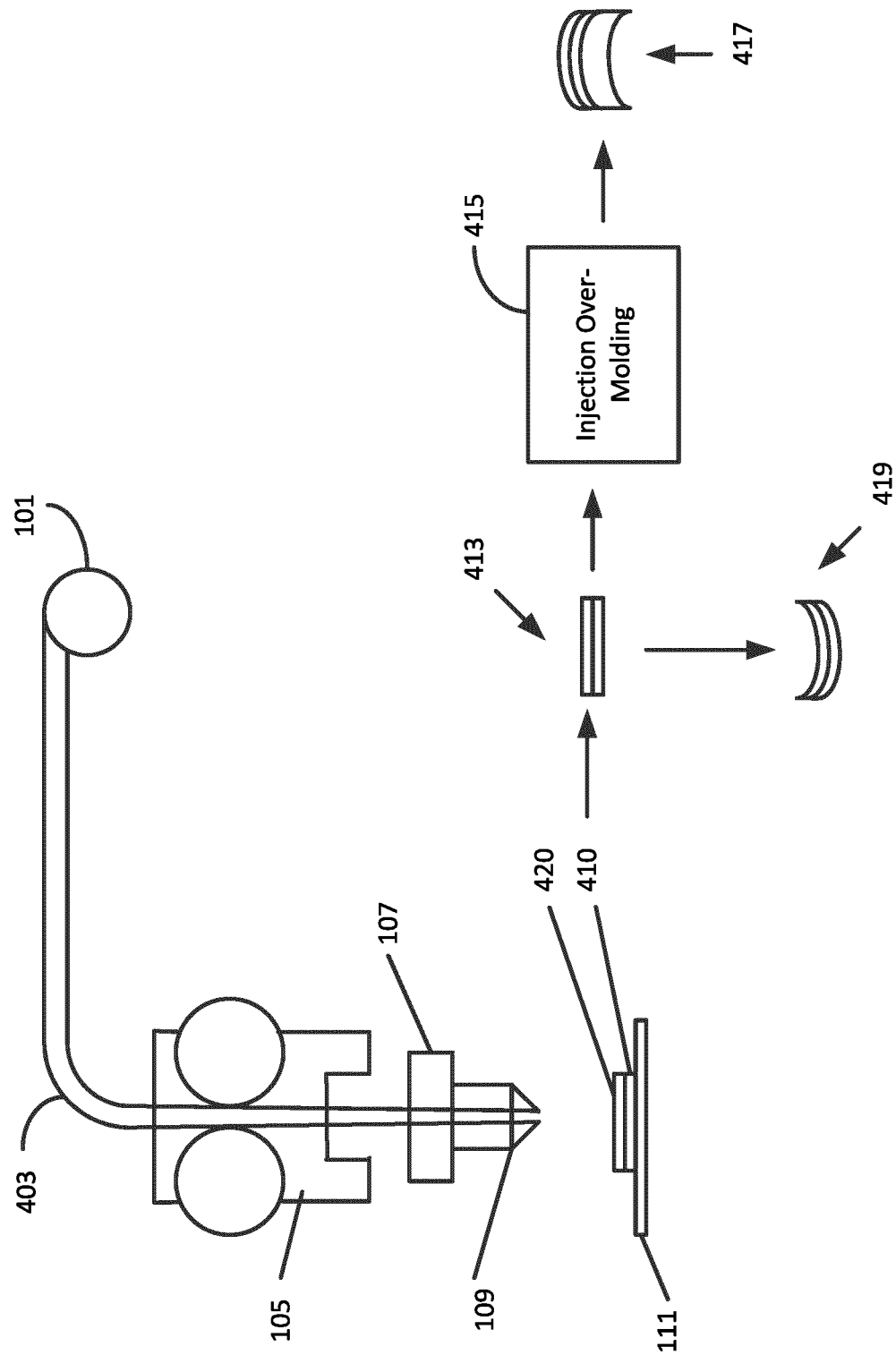
FIG. 4 is a schematic diagram of a system for manufacturing an optical lens using a FDM 3-D printer and injection over-molding in accordance with exemplary aspects of the disclosure.
Figure 9:
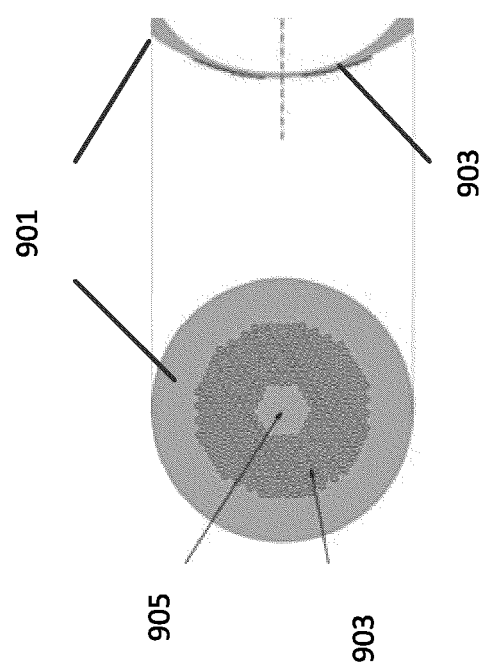
FIG. 9 illustrates micro lenses arrayed onto a single vision spectacle lens.

FIG. 4 is a schematic diagram of a system for manufacturing an optical lens using a FDM 3-D printer and injection over-molding in accordance with exemplary aspects of the disclosure. A filament spool 101 of thermoplastic (TP) filament 403 is supplied to an extruder 105, heated in a heater end 107, and through a nozzle 109 to print a functional layer 420 on the TP carrier 410. In some embodiments, a transparent TP carrier 410 is flat with a smooth surface on at least the front side (i.e., side facing away from the nozzle 109) is obtained. An FDM 3-D printer prints on the back side of the carrier 410 a transparent layer 420 using a TP filament 403. The TP filament 403 may have specific light filters such as blue cut (BCT), color enhancement, photochromic (PhCh), and NIR cut to prepare a functional wafer 413. In some embodiments, in 419, the functional layer 413 may be thermally formed into a lens shape for desired optical properties. This functional wafer 413, or 419, can be used with a conventional injection over-molding process 415, as illustrated in FIG. 9, to produce an optical lens 417 with specific light filtering functions.

In some embodiments, several layers of different light filters can be printed on the TP carrier 410 to produce a wafer 413 of multiple-functions such as PhCh/BCT, BCT/NIR cut, PhCh/BCT/NIR cut, and other optical functions. Further, the TP carrier 410 can be made of TP film which itself has specific light filters to introduce additional functions.

It is preferred that the filament 403 for printing the functional layer 420 and the TP carrier 410 be made of either the same material or of materials compatible to each other to guarantee good bonding and optical clarity of the functional layer/carrier interface of the resulting wafer 413. Examples of same filament and carrier materials include but not limited to polycarbonate (PC), alicyclic polycarbonate copolymer, poly(methyl methacrylate) (PMMA), poly(methyl methacrylimide) (PMMI), polyamide (PA), copolyester, cellulose triacetate (TAC), thermoplastic polyurethane (TPU), and cyclic olefin copolymer (COC). Examples of dislike filament/carrier pairs include but not limited to PMMA/PC, Copolyester/PC, Polyester Alloy/PC, and Ali-cyclic Polycarbonate/PC. Non limiting examples of PMMA include Evonik ACRYLITE®, Arkema Altuglas®, and ChiMei ACRYREX®. Non limiting examples of PMMI include Evonik ACRYMID®. Non limiting examples of Copolyester including Eastman TRITAN™ and SK Chemical Ecozen®. Non limiting examples of polyester alloy include Sabic XYLEX™. Non limiting examples of ali-cyclic polycarbonate include Mitsubishi Chemical Corporation DURABIO™ and Teijin Planext®. Non limiting examples of PC include Sabic Lexan™, Teijin Panlite®, and Covestro Makrolon®.

Further, to use the 3D printed functional wafer 413 with injection over-molding 415, the lens material and the outmost layer of the back of the functional wafer 413 may be the same or compatible to guarantee good bonding and good clarity of the resulting optical lens. The above-mentioned examples of filament and carrier materials are also applicable in the case of lens materials.

Figure 5:
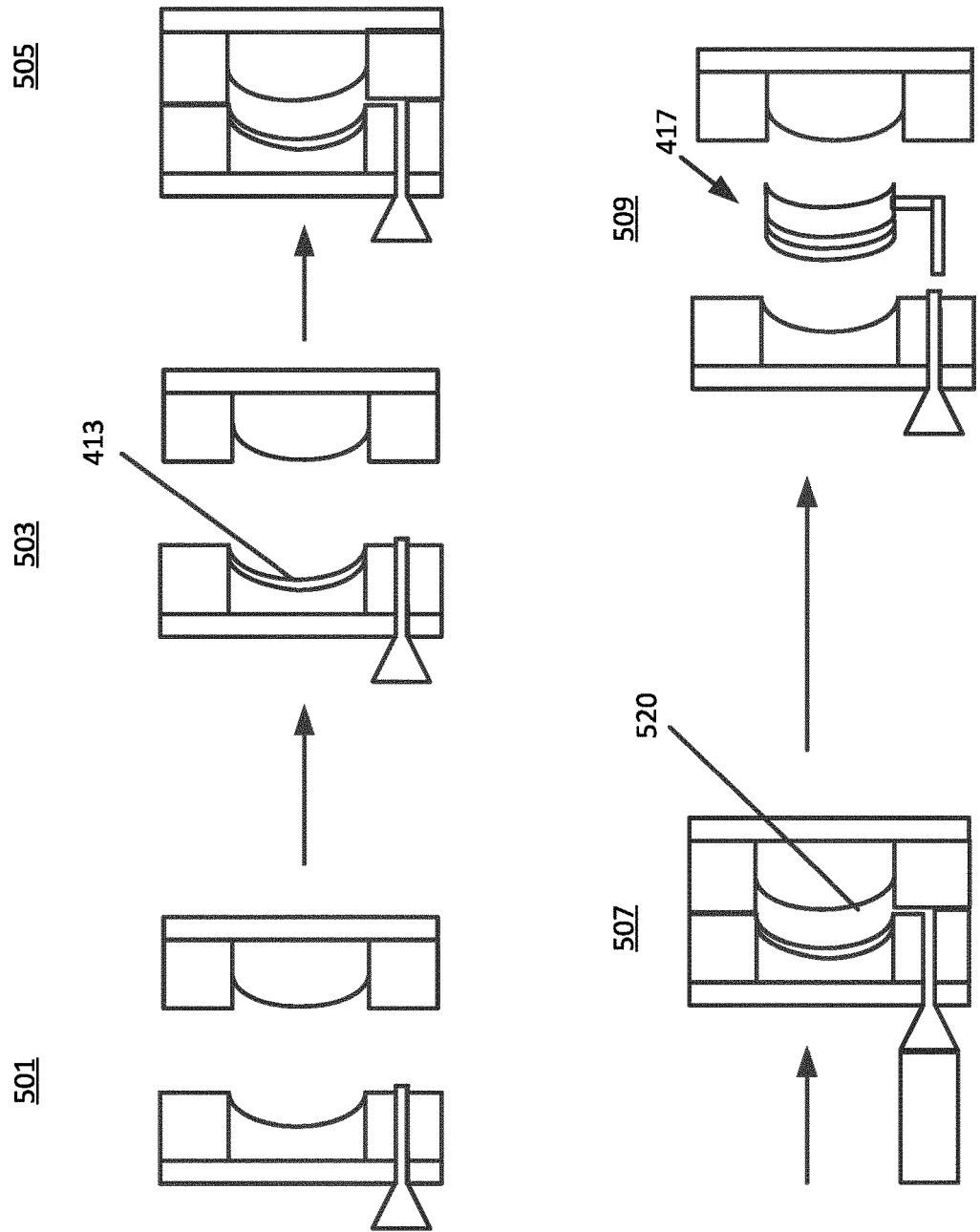
FIG. 5 is a schematic diagram of an injection over-molding process.

FIG. 5 is a schematic diagram of an injection over-molding process. An injection over-molding process 415 is used for integrating a functional wafer onto a thermoplastic lens. The whole process takes place at a constant cavity temperature ($T_{cavity}$) that is holding substantially below the glass transition temperature of the functional wafer material ($T_{g, wafer}$). In 501, the mold is opened. In 503, the functional wafer 413 is inserted into the mold. In 505, the mold is closed. In 507, molten lens material 520 is injected into the mold and the lens material 520 is fuse-bonded to the functional wafer 413. In 509, the lens 417 is ejected from the mold.

In some embodiments, the process flow may begin with a 3-layer flat laminate with smooth surfaces on at least one side as a carrier 410 to prepare a functional wafer 413 with FDM 3-D printing. Typical examples of laminates include PC/PVA/PC and TAC/PVA/TAC polarizing laminates, PC/PU/PC and PC/TPU/PC photochromic laminates, PC/MOF (multi-layer optical film)/PC polarizing and/or blue cut and/or mirror laminates. These types of laminates, especially PVA polarizing or MOF, often possess functions that are difficult to achieve through 3D printing alone. By combining with FDM 3-D printing, extra functions can be added to such laminates without having to modify the constituent layers. For example, a color enhancement layer can be printed on a PC/PVA/PC polarizing carrier to produce a polarizing wafer with color enhancement function. A similar method can be used to provide a color enhancement photochromic wafer by printing a color enhancement layer on a PC/PU/PC carrier.

In some embodiments, the transparent TP carrier is a polarizing laminate of multiple layers, where two or more of the layers are made of different materials. Polarizing laminates include, but are not limited to, polycarbonate (PC)/polyvinyl alcohol (PVA)/PC, cellulose triacetate (TAC)/PVA/TAC, polyamide (PA)/PVA/PA, cyclic olefin copolymer (COC)/PVA/COC, thermoplastic polyurethane (TPU)/PVA/TPU, and PC/multi-layer optical film (MOF)/PC. Although these laminates are symmetrical, non-symmetrical laminates may be used as well.

In some embodiments, the transparent TP carrier is a photochromic laminate of multiple layers, where two or more of the layers are made of different materials. Photochromatic laminates include, but are not limited to, polycarbonate (PC)/polyurethane (PU)/PC, PC/polyether block amide (PEBA)/PC, cellulose triacetate (TAC)/PU/TAC, TAC/PEBA/TAC, polyamide (PA)/PU/PA, PA/PEBA/PA, cyclic olefin copolymer (COC)/PU/COC, COC/PEBA/COC, and thermoplastic polyurethane (TPU)/PU/TPU, and TPU/PEBA/TPU. Although these laminates are symmetrical, non-symmetrical laminates may be used as well.

Figures 6, 7:
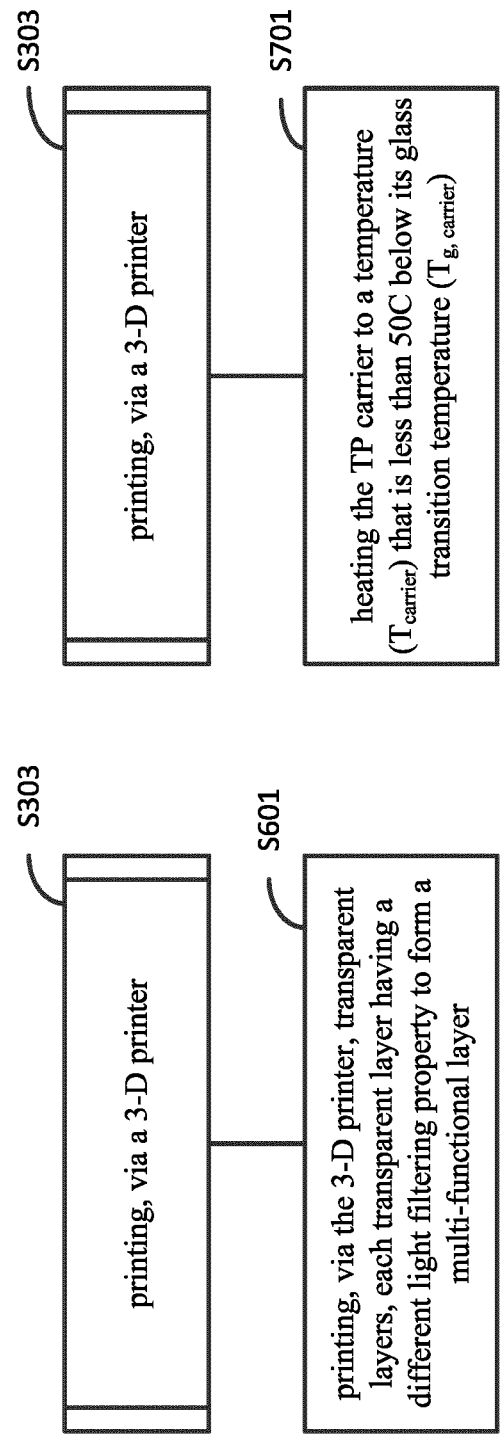
FIG. 6 is a flowchart of the method of FIG. 3 including printing transparent layers in accordance with exemplary aspects of the disclosure.
FIG. 7 is a flowchart of the method of FIG. 3 including heating the TP carrier to a temperature below the glass transition temperature.

FIG. 6 is a flowchart of the method of FIG. 3 including printing transparent layers in accordance with exemplary aspects of the disclosure. As mentioned above, several layers of different light filters can be printed on the TP carrier 410 to produce a wafer 413 of multiple-functions. In S601, the FDM 3-D printer prints several transparent layers 420, where each transparent layer has a different light filtering property to form a multi-functional layer.

FIG. 7 is a flowchart of the method of FIG. 3 including heating the TP carrier to a temperature below the glass transition temperature. In particular, to promote the quality of the 3D printed layer and to enhance the bonding strength between the 3D printed functional layer 420 and the TP carrier 410, it is preferred, during 3D printing (S303), in S701, to heat and maintain the carrier at a temperature ($T_{carrier}$) that is less than 50° C. below its glass transition temperature ($T_{g,\ carrier}$), i.e., $0 < T_{g,\ carrier} - T_{carrier} \leq 50°$ C., and more preferably, $5°$ C. $\leq T_{g,\ carrier} - T_{carrier} \leq 30°$ C. Such temperature condition can be achieved by using a heated printing bed and/or performing the 3D printing in a heated chamber.

One advantage of present disclosure is that conventional injection over-molding process with a constant mold temperature is used, which is far less complex in mold design and much shorter in cycle comparing to heat/cool processes. Further, supplementary and/or complementary functions can be added to an existing functional carrier, which significantly shortens the time and reduces the cost to develop a new functional wafer. And, as filament extrusion and FDM 3-D printing in general are performed under lower temperature, lower shear, and shorter residence time for the materials than injection molding processes, the present approach is more suitable for preparing functional wafers with heat sensitive dyes/filters than injection molding.

In some embodiments, rather than add a uniform layer, the FDM may 3D print specific patterns. Specific patterns may be used for writing some data linked to the lens manufacturing, using for instance IR absorbing dyes in the FDM deposited material. Specific patterns may also include micro lenses, a bifocal lens, a trifocal lens, and a progressive lens.

Figure 8:
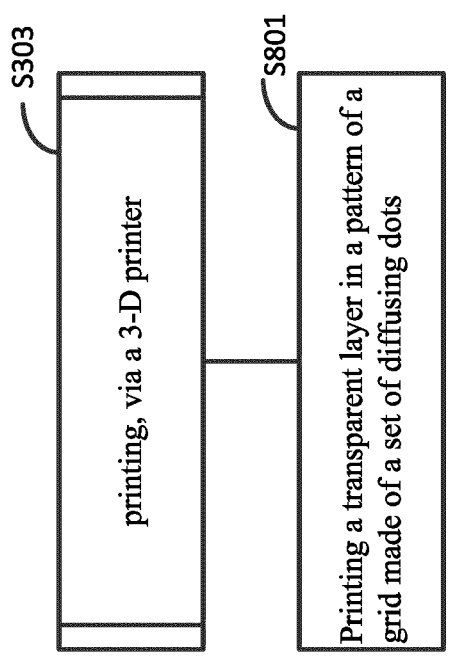
FIG. 8 is a flowchart of the method of FIG. 3 including printing a transparent layer in a pattern of a grid of diffusing dots.

In one embodiment, specific patterns may be formed for purposes of myopia control. FIG. 8 is a flowchart of the method of FIG. 3 including printing a transparent layer as a grid of diffusing dots. In S801, a grid made of a set of diffusing dots may be printed, as a solution to reduce contrast in the lens periphery (for example, in order to slow down myopia evolution for children, see US 2011/0313058). FIG. 9 illustrates micro lenses arrayed onto a single vision spectacle lens. The set of diffusing dots may be micro lenses, which are typically on the order of a tenth of a millimeter in diameter to about 1.1 millimeter in diameter, and about 1 micron in height. Refractive power is at the center 905 of the lens 901, while the micro lenses form an array 903 as the specific pattern.

In this embodiment, the refractive index (RI) of the FDM material needs to be different from the refractive index of the injected lens material to create optical scattering. For instance, using dots of 0.3 mm thickness and 0.3 mm width or diameter, having a refractive index difference $\Delta RI=0.01$ will be enough to provide optical scattering (0.3 mm×0.01>>wavelength of visible light). Smaller dots may be preferable to increase the scattering angle of the dots. For instance, a 0.2 mm diameter will scatter light on $(3/2)^2=2.25$ larger angular area.

In one embodiment, an FDM filament material having a scattering property may be added. This material may be PC mixed with pigments having a size between 100 nm and 10 μm.

Figure 11:
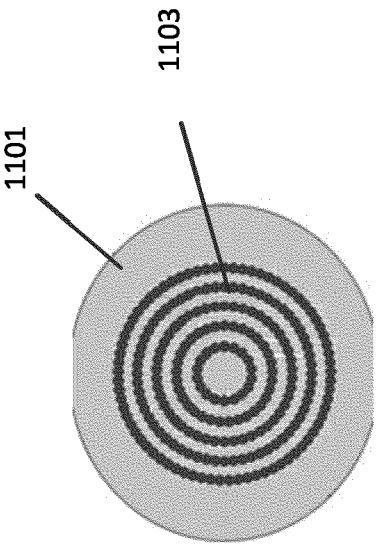
FIG. 11 illustrates a functional wafer with a specific pattern in accordance with exemplary aspects of the disclosure.
Figure 10:
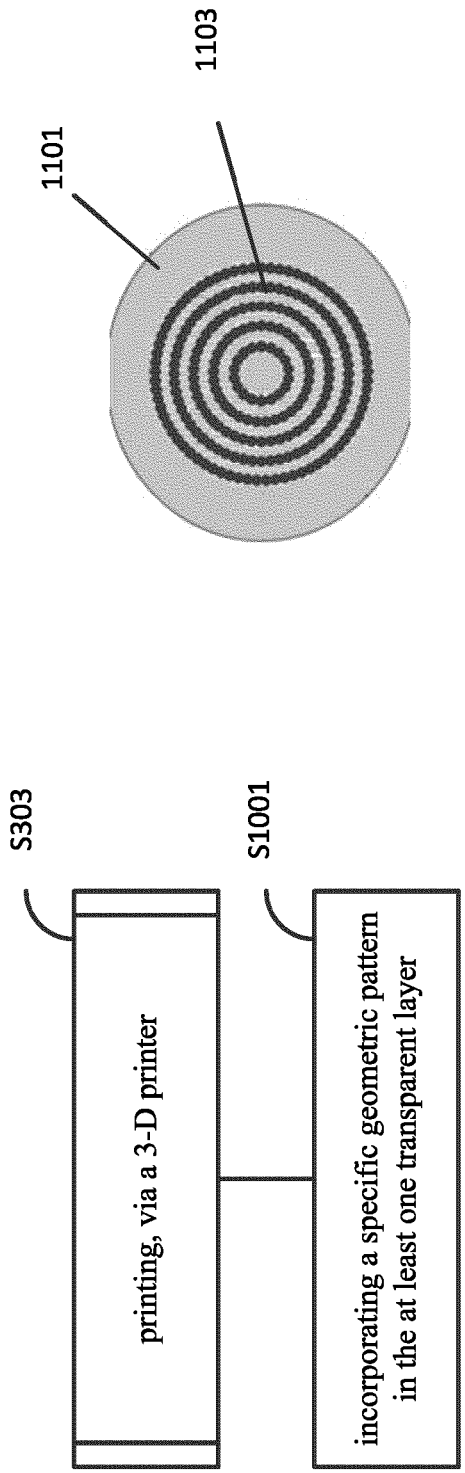
FIG. 10 is a flowchart of the method of FIG. 3 including incorporating a specific geometric pattern.

In some embodiments, other patterns may be printed. FIG. 10 is a flowchart of the method of FIG. 3 including incorporating a specific pattern. In S1001, the transparent layer may be printed as a specific geometric pattern. FIG. 11 illustrates a functional wafer with a specific geometric pattern in accordance with exemplary aspects of the disclosure. In FIG. 11, a wafer 1101 includes a deposition via FDM of a specific geometric pattern 1103 for scattering light. In particular, the specific geometric pattern is a set of rings, each ring being concentric, and made of joint circular shapes having 0.3 mm or less diameter and RI of the TP carrier≠RI of the FDM patterned material.

Experimental Implementation 1

As one experimental implementation, a color-enhancing polarizing wafer and lens was manufactured. In the implementation, a 650 μm thick PC/PVA/PC neutral gray polarizing laminate with 35% transmittance from Onbitt was die-cut into a Ø76 mm round carrier.

Sabic Lexan® OQ3820 is a UV-stabilized polycarbonate (PC) grade for ophthalmic lenses. This PC resin has a glass transition temperature of 145° C. and a UV-cut about 380 nm as measured through a 2 mm thick lens. OQ3820 PC resin was compounded with two color enhancing dyes having absorption peaks around 495 nm and 585 nm, respectively, and then extruded into a Ø1.75 mm filament.

Using the filament, a 0.1 mm thick color-enhancing layer was then printed onto the PC/PVA/PC polarizing carrier with an FDM 3-D printer in a heated chamber maintained at 120° C. to produce a color-enhancing polarizing wafer. The resulting flat wafer had a rough surface on the 3D printed side but a smooth surface on the opposite face.

To produce a polarizing lens with color enhancement function, the wafer was applied in the injection over-mold process illustrated in FIG. 5 with the smooth side facing the concave insert and the rough color-enhancing layer facing the melt using OQ3820 PC resin as the lens material with the key parameters listed below:

| | |
|---|---|
| Concave insert | Steel, Ø76 mm, and R353.3 mm |
| Convex insert | Steel, Ø76 mm, and R88.3 mm |
| Lens material | Sabic Lexan ® OQ3820 PC |
| Carrier | PC/PVA/PC 35% T polarizer from Onbitt |
| Color-enhancing layer | Sabic Lexan ® OQ3820 PC + 2 color-enhancing dyes |
| FDM printed wafer geometry | Flat, Ø76 mm, thickness 0.75 mm |
| $T_{g,lens}$ | 145° C. |
| $T_{g,wafer}$ | 145° C. |
| Melt temperature ($T_{melt}$) | 260° C. |
| $T_{cavity}$ | 120° C. |

The resulting 1.50 base semi-finished (SF) lens, 10 mm in thickness, was optically transparent with smooth front and back surfaces and showed both polarizing and color enhancement functions.

Experimental Implementation 2

As a second experimental implementation, a blue cut wafer and lens was manufactured.

A 250 μm thick commercially available clear PC film with a total transmittance of 91% and a UV cut-off<300 nm was die-cut into a Ø76 mm round carrier.

Sabic Lexan® OQ3820 is a UV-stabilized polycarbonate (PC) grade for ophthalmic lenses. This PC resin has a glass transition temperature of 145° C. and a UV-cut about 380 nm as measured through a 2 mm thick lens. OQ3820 PC resin was compounded with 1.0% of Tinuvin® 326 UV absorber from BASF and extruded into Ø1.75 mm filaments.

Using the filament, a 0.25 mm thick layer was then printed onto said PC carrier with an FDM 3-D printer in a heated chamber maintained at 120° C. to produce a blue cut wafer. The resulting flat wafer had a rough surface on the 3D printed side but a smooth surface on the opposite face.

To produce a blue cut lens, the wafer was applied in the injection over-mold process illustrated in FIG. 4 with the smooth side facing the concave insert and the rough blue cut layer facing the melt using OQ3820 PC resin as the lens material with the key parameters listed below:

| | |
|---|---|
| Concave insert | Steel, Ø76 mm, and R353.3 mm |
| Convex insert | Steel, Ø76 mm, and R88.3 mm |
| Lens material | Sabic Lexan ® OQ3820 PC |
| Carrier | PC |
| Color-enhancing layer | Sabic Lexan ® OQ3820 PC + 1.0% BASF Tinuvin 326 |
| FDM printed wafer geometry | Flat, Ø76 mm, thickness 0.5 mm |
| $T_{g,lens}$ | 145° C. |
| $T_{g,wafer}$ | 150° C. |
| Melt temperature ($T_{melt}$) | 260° C. |
| $T_{cavity}$ | 120° C. |

The resulting 1.50 base semi-finished (SF) lens, 10 mm in thickness, not only was optically transparent with smooth front and back surfaces but also gave a UV-cut about 402 nm after surfacing to 2 mm plano. In addition, the blue cut performance BVC B' was measured to be about 30%.

Figure 12:
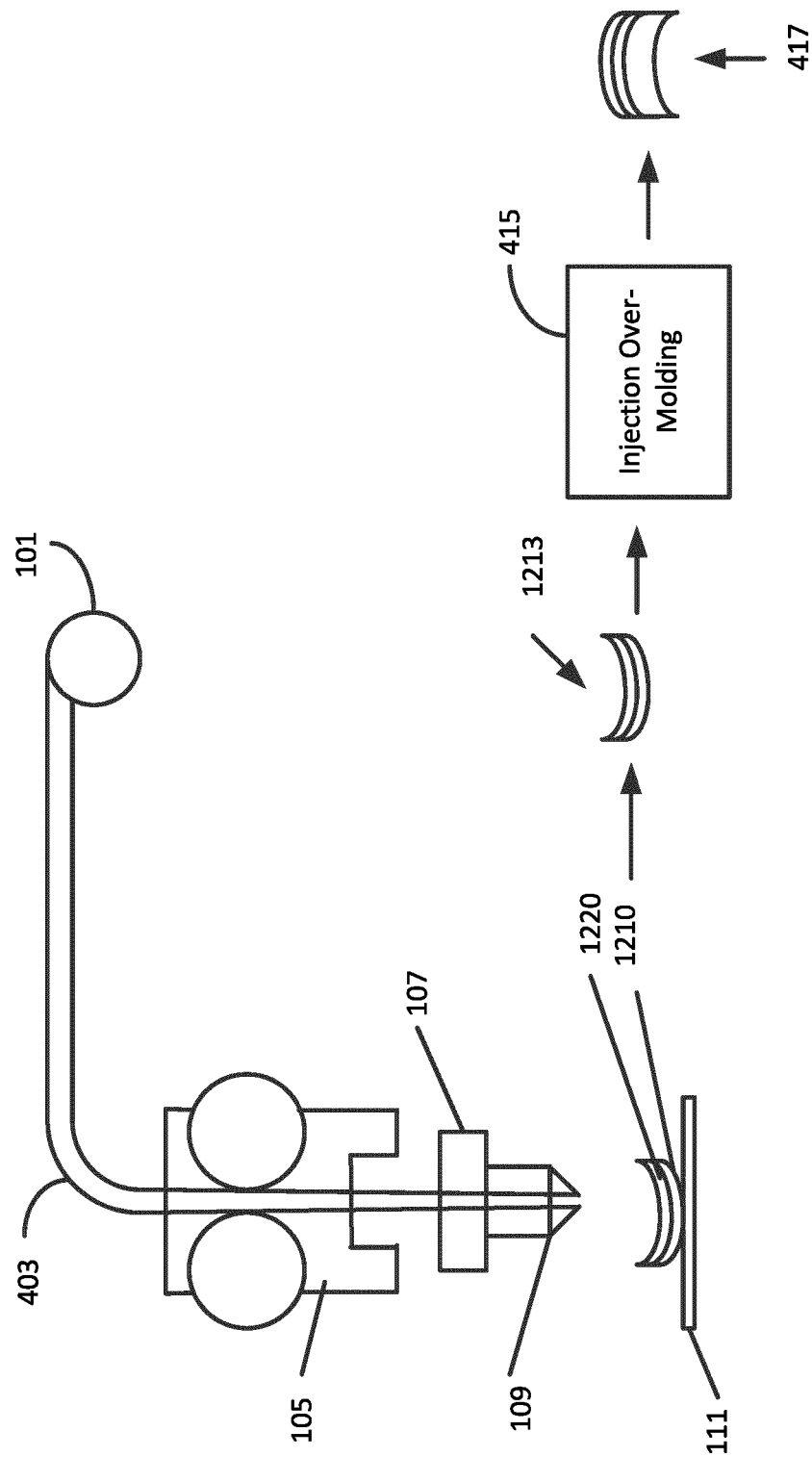
FIG. 12 is a schematic diagram of a system for manufacturing an optical lens using a FDM 3-D printer and injection over-molding in accordance with exemplary aspects of the disclosure.

FIG. 12 illustrates a process flow of making a functional lens using a functional wafer by FDM 3-D printing of thermoplastic (TP) functional layer(s) on a curved single-layer TP carrier.

In FIG. 12, a curved and transparent TP carrier 1210 with a smooth surface on the back side, or on both sides, is used with an FDM 3-D printer to print on the concave side of the carrier 1210 a transparent layer 1220 using a TP filament 403 having specific light filters such as blue cut (BCT), color enhancement, photochromic (PhCh), and NIR cut to prepare a functional wafer 1213. This functional wafer 1213 can then be used with a conventional injection over-molding process 415 as illustrated in FIG. 5 to produce an optical lens 417 with specific light filtering functions. In some embodiments, similar to the above case in FIG. 4, several layers of different light filters can be printed on the carrier 1210 to have a wafer 1213 of multi-functions such as PhCh/BCT, BCT/NIR cut, PhCh/BCT/NIR cut, etc. Further, the carrier 1210 can be made of TP film with specific light filters to introduce more functionality.

In some embodiments, the FDM 3-D printer for printing on the curved TP carrier 1210 may be a type of 3-D printer particularly arranged for printing on surfaces other than flat surfaces. For example, a specialized 3-D printer may include control over the angle of the nozzle 109 such that the nozzle is continuously adjusted to face a direction that is perpendicular to the tangent of the curved surface.

(1) A method of manufacturing an optical lens, including:
obtaining a transparent thermoplastic (TP) carrier with at least one smooth surface;
printing, via a 3-D printer on the side opposite to the at least one smooth surface of the transparent TP carrier, at least one transparent layer using a thermoplastic filament, each transparent layer having a predetermined light filtering property, thereby forming a functional layer; and
performing an injection over-molding process to fuse bond the functional layer to a thermoplastic substrate thereby forming the optical lens.

(2) The method according to (1), in which the printing includes:
printing, via the 3-D printer, a plurality of transparent layers, each transparent layer having a different light filtering property to form a multi-functional layer,
wherein the light filtering property is one of a group consisting of ultraviolet (UV) cut, blue cut, color enhancement, photochromic, and near infrared (NIR) cut.

(3) The method according (1) or (2), in which the transparent TP carrier has at least one predetermined light filtering property.

(4) The method according to any of (1) to (3), in which the thermoplastic filament includes a filament material that is compatible with a material of the transparent TP carrier in order to strengthen bonding of the transparent layer to the transparent TP carrier.

(5) The method according to any of (1) to (4), in which the filament material is selected from a group consisting of polycarbonate (PC), alicyclic polycarbonate copolymer, poly(methyl methacrylate) (PMMA), poly(methyl methacrylimide) (PMMI), polyamide (PA), polyester, copolyester, polysulfone (PSU), cellulose triacetate (TAC), thermoplastic polyurethane (TPU), and cyclic olefin copolymer (COC).

(6) The method according to any of (1) to (5), in which the thermoplastic substrate has a material that is compatible with a material of an outmost layer of the functional layer in order to strengthen bonding of the thermoplastic substrate to the functional layer.

(7) The method according to any of (1) to (6), in which the transparent TP carrier is a polarizing laminate of a plurality of layers, wherein two or more of the layers are of different materials selected from a group consisting of polycarbonate (PC), polyvinyl alcohol (PVA), cellulose triacetate (TAC), polyamide (PA), cyclic olefin copolymer (COC), thermoplastic polyurethane (TPU), and multi-layer optical film (MOF).

(8) The method according to any of (1) to (7), in which the transparent TP carrier is a photochromic laminate of a plurality of layers, wherein two or more of the layers are of different materials selected from a group consisting of polycarbonate (PC), polyurethane (PU), polyether block amide (PEBA), cellulose triacetate (TAC), polyamide (PA), cyclic olefin copolymer (COC), and thermoplastic polyurethane (TPU).

(9) The method according to any of (1) to (8), in which the printing further comprises heating the TP carrier to a temperature ($T_{carrier}$) that is less than 50° C. below its glass transition temperature ($T_{g,\ carrier}$).

(10) The method according to (9), in which, during the printing, heating the TP carrier such that $0°\ C. < T_{g,\ carrier} - T_{carrier} \leq 50°\ C.$

(11) The method according to (10), in which, during the printing, heating the TP carrier such that $5°\ C. \leq T_{g,\ carrier} - T_{carrier} \leq 30°\ C.$

(12) The method according to any of (1) to (11), in which the printing further comprises incorporating a specific pattern into the at least one transparent layer.

(13) The method according to (12), in which the specific pattern includes data regarding the lens manufacturer and is incorporated using IR absorbing dyes.

(14) The method according to any of (1) to (13), in which the at least one transparent layer is printed as a grid made of a set of diffusing dots having different refractive index than that of the thermoplastic substrate.

(15) The method according to any of (1) to (14), in which the at least one transparent layer is printed as a grid made of a set of light scattering dots having size between 100 nm and 10 µm.

(16) A method of manufacturing an optical lens, including:
obtaining a curved and transparent thermoplastic (TP) carrier with smooth surfaces on both sides;
printing, via a 3-D printer on a concave side of the curved and transparent TP carrier, at least one transparent layer using a thermoplastic filament, each transparent layer having a predetermined light filtering property, thereby forming a functional layer; and
performing an injection over-molding process to fuse bond the functional layer to a thermoplastic substrate thereby forming the optical lens.

(17) The method according to (16), wherein the printing includes:
printing, via the 3-D printer, a plurality of transparent layers, each transparent layer having a different light filtering property to form a multi-functional layer,
in which the light filtering property is one of a group consisting of ultraviolet (UV) cut, blue cut, color enhancement, photochromic, and near infrared (NIR) cut.

(18) The method according to (16) or (17), in which the curved and transparent TP carrier has at least one predetermined light filtering property.

(19) The method according to any of (16) to (18), in which the thermoplastic filament includes a filament material that is compatible with a material of the curved and transparent TP carrier in order to strengthen bonding of the transparent layer to the curved and transparent TP carrier.

(20) The method according to (19), in which the filament material is selected from a group consisting of polycarbonate (PC), alicyclic polycarbonate copolymer, poly(methyl methacrylate) (PMMA), poly(methyl methacrylimide) (PMMI), polyamide (PA), polyester, copolyester, polysulfone (PSU), cellulose triacetate (TAC), thermoplastic polyurethane (TPU), and cyclic olefin copolymer (COC).

Numerous modifications and variations of the present invention are possible in light of the above teachings. It is therefore to be understood that within the scope of the appended claims, the invention may be practiced otherwise than as specifically described herein.

The invention claimed is:

1. A method of manufacturing an optical lens, comprising:
obtaining a transparent thermoplastic (TP) carrier with at least one smooth surface;
printing, via a 3-D printer on the side opposite to the at least one smooth surface of the transparent TP carrier, at least one transparent layer using a thermoplastic filament, each transparent layer having a predetermined light filtering property, thereby forming a functional layer; and
performing an injection over-molding process to fuse bond the functional layer to a thermoplastic substrate thereby forming the optical lens, wherein the at least one smooth surface of the transparent TP carrier forms a smooth surface of the manufactured optical lens, so that the transparent TP carrier is included in the manufactured optical lens.

2. The method according to claim 1, wherein the printing includes:
printing, via the 3-D printer, a plurality of transparent layers, each transparent layer having a different light filtering property to form a multi-functional layer,
wherein the light filtering property is one of a group consisting of ultraviolet (UV) cut, blue cut, color enhancement, photochromic, and near infrared (NIR) cut.

3. The method according to claim 1, wherein the transparent TP carrier has at least one predetermined light filtering property.

4. The method according to claim 1, wherein the thermoplastic filament includes a filament material that is compatible with a material of the transparent TP carrier in order to strengthen bonding of the transparent layer to the transparent TP carrier.

5. The method according to claim 4, wherein the filament material is selected from a group consisting of polycarbonate (PC), alicyclic polycarbonate copolymer, poly(methyl methacrylate) (PMMA), poly(methyl methacrylimide) (PMMI), polyamide (PA), polyester, copolyester, polysulfone (PSU), cellulose triacetate (TAC), thermoplastic polyurethane (TPU), and cyclic olefin copolymer (COC).

6. The method according to claim 1, wherein the thermoplastic substrate has a material that is compatible with a material of an outmost layer of the functional layer in order to strengthen bonding of the thermoplastic substrate to the functional layer.

7. The method according to claim 1, wherein the transparent TP carrier is a polarizing laminate of a plurality of layers, wherein two or more of the layers are of different materials selected from a group consisting of polycarbonate (PC), polyvinyl alcohol (PVA), cellulose triacetate (TAC), polyamide (PA), cyclic olefin copolymer (COC), thermoplastic polyurethane (TPU), and multi-layer optical film (MOF).

8. The method according to claim 1, wherein the transparent TP carrier is a photochromic laminate of a plurality of layers, wherein two or more of the layers are of different materials selected from a group consisting of polycarbonate (PC), polyurethane (PU), polyether block amide (PEBA), cellulose triacetate (TAC), polyamide (PA), cyclic olefin copolymer (COC), and thermoplastic polyurethane (TPU).

9. The method according to claim 1, wherein the printing further comprises heating the TP carrier to a temperature ($T_{carrier}$) that is less than 50° C. below its glass transition temperature ($T_{g,\ carrier}$), such that $0°\ C.<T_{g,\ carrier}-T_{carrier}<50°\ C.$ 10. The method according to claim 9, wherein the heating is such that $5°\ C.\leq T_{g,\ carrier}-T_{carrier}\leq 30°\ C.$ 11. The method according to claim 1, wherein the printing further comprises incorporating a specific pattern into the at least one transparent layer.

12. The method according to claim 11, wherein the specific pattern-includes data regarding the lens manufacturer and is incorporated using IR absorbing dyes.

13. The method according to claim 11, wherein the specific pattern is for scattering light and is a set of rings, each ring being concentric, and made of joint circular shapes having 0.3 mm or less diameter with a refraction index of the transparent TP carrier which is different from the refraction index of the material of the specific pattern.

14. The method according to claim 1, wherein the at least one transparent layer is printed as a grid made of a set of:
diffusing dots having different refractive index than that of the thermoplastic substrate, or of light scattering dots having size between 100 nm and 10 µm.

15. The method according to claim 1, wherein:
the obtaining step of the transparent TP carrier is such that the transparent TP carrier is curved with smooth surfaces on both sides of the transparent TP carrier; and
the printing step is implemented via the 3-D printer on a concave side of the curved and transparent TP carrier.

16. The method according to claim 1, wherein the at least one smooth surface of the transparent TP carrier faces a concave insert of an injection mold in which the injection over-molding process is performed.

* * * * *